(12) United States Patent
Goodman et al.

(10) Patent No.: US 8,768,068 B2
(45) Date of Patent: Jul. 1, 2014

(54) AUTOMATED BUILDING DETECTING (75) Inventors: Vernon R. Goodman, Rockwall, TX (US); John T. Crews, Garland, TX (US)

(73) Assignee: Raytheon Company, Waltham, MA (US)

(*) Notice: Subject to any disclaimer, the term of this patent is extended or adjusted under 35 U.S.C. 154(b) by 682 days.

(21) Appl. No.: 13/100,422

(22) Filed: May 4, 2011

(65) Prior Publication Data

US 2013/0108148 A1   May 2, 2013

(51) Int. Cl.
G06K 9/48 (2006.01)

(52) U.S. Cl.
USPC ........... 382/199; 382/154; 382/109; 382/103; 382/172

(58) Field of Classification Search
USPC .................... 382/109, 103, 154, 172, 199
See application file for complete search history.

(56) References Cited

U.S. PATENT DOCUMENTS

| | | | | |
|---|---|---|---|---|
| 5,259,037 A * | 11/1993 | Plunk | ............................ | 382/154 |
| 5,270,756 A * | 12/1993 | Busenberg | .................... | 348/144 |
| 5,275,354 A * | 1/1994 | Minor et al. | ................. | 244/3.17 |
| 5,461,709 A * | 10/1995 | Brown | .......................... | 715/848 |
| 5,467,444 A * | 11/1995 | Kawamura et al. | ........... | 345/441 |
| 5,472,163 A * | 12/1995 | Callas | ........................ | 248/206.5 |
| 5,555,018 A * | 9/1996 | von Braun | .................... | 348/144 |
| 5,579,456 A * | 11/1996 | Cosman | ....................... | 345/419 |
| 5,692,061 A * | 11/1997 | Sasada et al. | ................. | 382/106 |
| 5,809,179 A * | 9/1998 | Marimont et al. | ............ | 382/254 |
| 5,887,083 A * | 3/1999 | Sumi et al. | ................... | 382/199 |
| 6,836,270 B2 * | 12/2004 | Du | .............................. | 345/419 |
| 7,279,893 B1 | 10/2007 | Marinelli et al. | | |
| 7,304,645 B2 | 12/2007 | Blask et al. | | |
| 7,509,241 B2 * | 3/2009 | Guo et al. | ......................... | 703/2 |
| 7,653,218 B1 * | 1/2010 | Malitz et al. | .................. | 382/113 |
| 7,873,238 B2 * | 1/2011 | Schultz et al. | ................ | 382/284 |
| 7,995,054 B2 * | 8/2011 | Wheeler et al. | ............... | 345/419 |
| 8,125,620 B2 | 2/2012 | Lewis | | |
| 8,150,120 B2 | 4/2012 | Gindele et al. | | |

(Continued)

FOREIGN PATENT DOCUMENTS

| | | |
|---|---|---|
| WO | WO 2008/004230 | 1/2008 |
| WO | WO 2011/064132 | 6/2011 |

OTHER PUBLICATIONS

Urban-Area and—Theory, Sirmacek et al., IEEE, 0196-2892, 2009, pp. 1156-1167.*

(Continued)

*Primary Examiner* — Jayesh A Patel
(74) *Attorney, Agent, or Firm* — Daly, Crowley, Mofford & Durkee, LLP (57) ABSTRACT

In one aspect, a computerized method to automatically detect buildings includes determining if each point of a set of filtered points is on a line by processing the set of filtered points in one pass including a) locating a first point of the set of filter points nearest to a second point of the set of filtered points, b) determining if the distance between the first point and the second point is greater than a distance threshold; c) determining if the first point and the second point have collinearity greater than a collinearity threshold; and d) designating the first point as an endpoint of a line that includes the second point if the distance between the first point and the second point is greater than the distance threshold and if the first point and the second point have collinearity greater than the collinearity threshold.

19 Claims, 5 Drawing Sheets

(56) References Cited

U.S. PATENT DOCUMENTS

| | | | |
|---|---|---|---|
| 8,401,222 B2* | 3/2013 | Thornberry et al. | 382/100 |
| 8,406,567 B2* | 3/2013 | Pizlo et al. | 382/285 |
| 8,422,765 B2* | 4/2013 | Tsai et al. | 382/154 |
| 8,659,747 B2* | 2/2014 | Goodman | 356/4.01 |
| 8,670,961 B2* | 3/2014 | Pershing et al. | 703/2 |
| 2002/0061132 A1* | 5/2002 | Furukawa | 382/154 |
| 2003/0014224 A1* | 1/2003 | Guo et al. | 703/1 |
| 2003/0147553 A1* | 8/2003 | Chen et al. | 382/154 |
| 2004/0217956 A1* | 11/2004 | Besl et al. | 345/419 |
| 2008/0021683 A1* | 1/2008 | Rahmes et al. | 703/7 |
| 2008/0089610 A1* | 4/2008 | Tao et al. | 382/285 |
| 2009/0073440 A1 | 3/2009 | Tiemeyer | |
| 2009/0132210 A1* | 5/2009 | Royan et al. | 703/1 |
| 2010/0045674 A1* | 2/2010 | Clifton | 345/424 |
| 2010/0217529 A1* | 8/2010 | Stroila et al. | 702/5 |
| 2011/0169117 A1 | 7/2011 | McIntosh et al. | |
| 2013/0108148 A1 | 5/2013 | Goodman et al. | |

OTHER PUBLICATIONS

TEC-0107 Research in—Imagery, McKeown et al., Jun. 11, 1998 103, Mar. 1998, pp. 1-50.*

Real-time—transform, Fernandes et al., Eisevier, 0031-3203, 2007, pp. 299-314.*

Michael E. O'Brien et al., "Simulation of 3D Laser Radar Systems," Lincoln Laboratory Journal, vol. 16, No. 1, 2005, pp. 37-60.

PAIR File through Nov. 8, 2013 for U.S. Appl. No. 13/162,935, filed Jun. 17, 2011 230 pgs.

KML Support in Google Maps and Google Maps for Mobile, http://code.google.com/apis/kml/documentation/mapsSupport.html1, printed May 9, 2011, 3 pages.

KML Reference, alphabetical reference for all KML elements defined in KML Version 2.2 and in the Google extension namespace, http://code.google.com/apis/kml/documentation/kmlreference.html, printed May 9, 2011, 97 pages.

* cited by examiner

AUTOMATED BUILDING DETECTING

BACKGROUND

Laser Detection and Ranging (LADAR) sensor, sometimes referred to as laser radar, uses laser beams to measure distances. A LADAR sensor can be used to form images of scenes with a high degree of definition (e.g., 3 cm resolution at 1,000 meters). LADAR sensors are classified as three-dimensional (3-D) sensor because the output of the data from these sensors includes 3-D data with, for example, x-, y-, and z-coordinates. Other 3-D sensors include, but are not limited to, synthetic aperture radar (SAR) and stereo-optic imagers.

SUMMARY

In one aspect, a computerized method to automatically detect buildings includes receiving three-dimensional (3-D) data from a 3-D sensor and filtering the 3-D data to form a set of filtered points that include points greater than an altitude threshold. The method also includes determining if each point of the set of filtered points is on a line by processing the set of filtered points in one pass including a) locating a first point of the set of filter points nearest to a second point of the set of filtered points, b) determining if the distance between the first point and the second point is greater than a distance threshold; c) determining if the first point and the second point have collinearity greater than a collinearity threshold; d) designating the first point as an endpoint of a line that includes the second point if the distance between the first point and the second point is greater than the distance threshold and if the first point and the second point have collinearity greater than the collinearity threshold; e) repeating steps a to e substituting an unprocessed point as the first point and the first point as the second point if the first point is designated as an endpoint. The method further includes generating an output file comprising a set of lines corresponding to building edges based on the processing of the set of filtered points in one pass.

In another aspect, an apparatus includes circuitry to automatically detect buildings. comprising circuitry to receive three-dimensional (3-D) data from a 3-D sensor and filter the 3-D data to form a set of filtered points comprising points greater than an altitude threshold. The circuitry also includes circuitry to determine if each point of the set of filtered points is on a line by processing the set of filtered points in one pass including circuitry to: a) locate a first point of the set of filter point nearest to a second point of the set of filtered points; b) determine if the distance between the first point and the second point is greater than a distance threshold; c) determine if the first point and the second point have collinearity greater than a collinearity threshold; d) designate the first point as an endpoint of a line that includes the second point if the distance between the first point and the second point is greater than the distance threshold and if the first point and the second point have collinearity greater than the collinearity threshold; and e) repeat steps a to e substituting an unprocessed point as the first point and the first point as the second point if the first point is designated as an endpoint. The circuitry further includes circuitry to generate an output file comprising a set of lines corresponding to building edges based on the processing of the set of filtered points in one pass.

In a further aspect, an article includes a non-transitory machine-readable medium that stores executable instructions to automatically detect buildings. The instructions cause a machine to receive three-dimensional (3-D) data from a 3-D sensor and filter the 3-D data to form a set of filtered points comprising points greater than an altitude threshold. The instructions also cause the machine to determine if each point of the set of filtered points is on a line by processing the set of filtered points in one pass including instructions that cause the machine to: a) locate a first point of the set of filter point nearest to a second point of the set of filtered points; b) determine if the distance between the first point and the second point is greater than a distance threshold; c) determine if the first point and the second point have collinearity greater than a collinearity threshold; d) designate the first point as an endpoint of a line that includes the second point if the distance between the first point and the second point is greater than the distance threshold and if the first point and the second point have collinearity greater than the collinearity threshold; and e) repeat steps a to e substituting an unprocessed point as the first point and the first point as the second point if the first point is designated as an endpoint. The instructions further cause the machine to generate an output file comprising a set of lines corresponding to building edges based on the processing of the set of filtered points in one pass.

DETAILED DESCRIPTION

Described herein are techniques for using data from a three-dimensional (3-D) sensor (e.g., a Laser Detection and Ranging (LADAR) sensor, a synthetic aperture radar (SAR) and so forth) to detect buildings. For example, a 3-D sensor is used to generate a file that may be used by geo-engines (e.g., GOOGLE® Earth, GOOGLE® maps and so forth) to present a geographic scene with buildings identified (e.g., with an overlay). In one particular example, keyhole markup language (KML) files are automatically (e.g., without user intervention) generated that identify buildings (e.g., three-dimensional (3-D) buildings).

Prior art attempts to identify buildings in a geographic scene have been performed manually or semi-automatically. For example, a user would typically locate buildings and choose the dimensions and heights of the buildings in a geographic scene and then semi-automated algorithms would generate KML file(s) defining the buildings. Other approaches may try to identify the raised flat areas of building roofs. These approaches may suffer when the roofs are irregularly shaped or when equipment (e.g. air conditioners, cooling towers, or decorative structures) are present on the rooftops.

Figure 1:
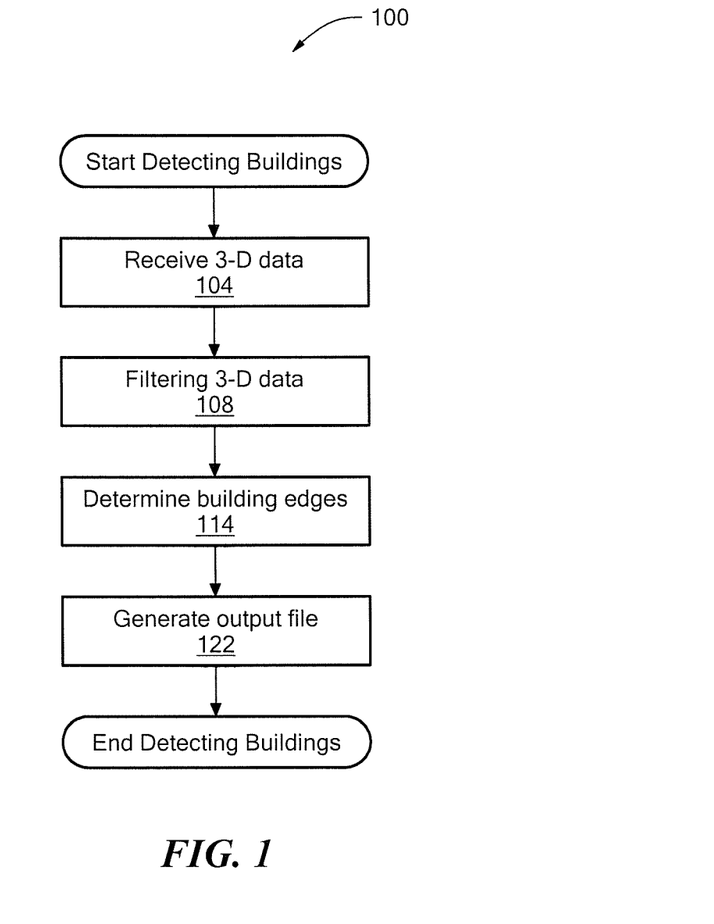
FIG. 1 is a flowchart of an example of a process to detect buildings.

Referring to FIG. 1, an example of process to automatically detect buildings from data from a 3-D sensor is a process 100. Process 100 receives 3-D data from a 3-D sensor (104) and filters the 3-D data (108). From the filtered 3-D data, process 100 determines building edges (114) and generates an output file (122). For example, the output file is a set of lines corresponding to edges of buildings. In one particular example, the output file is a KML script file that can be used with commercially available software such as GOOGLE® Earth to show buildings in a geographic scene.

Figure 2:
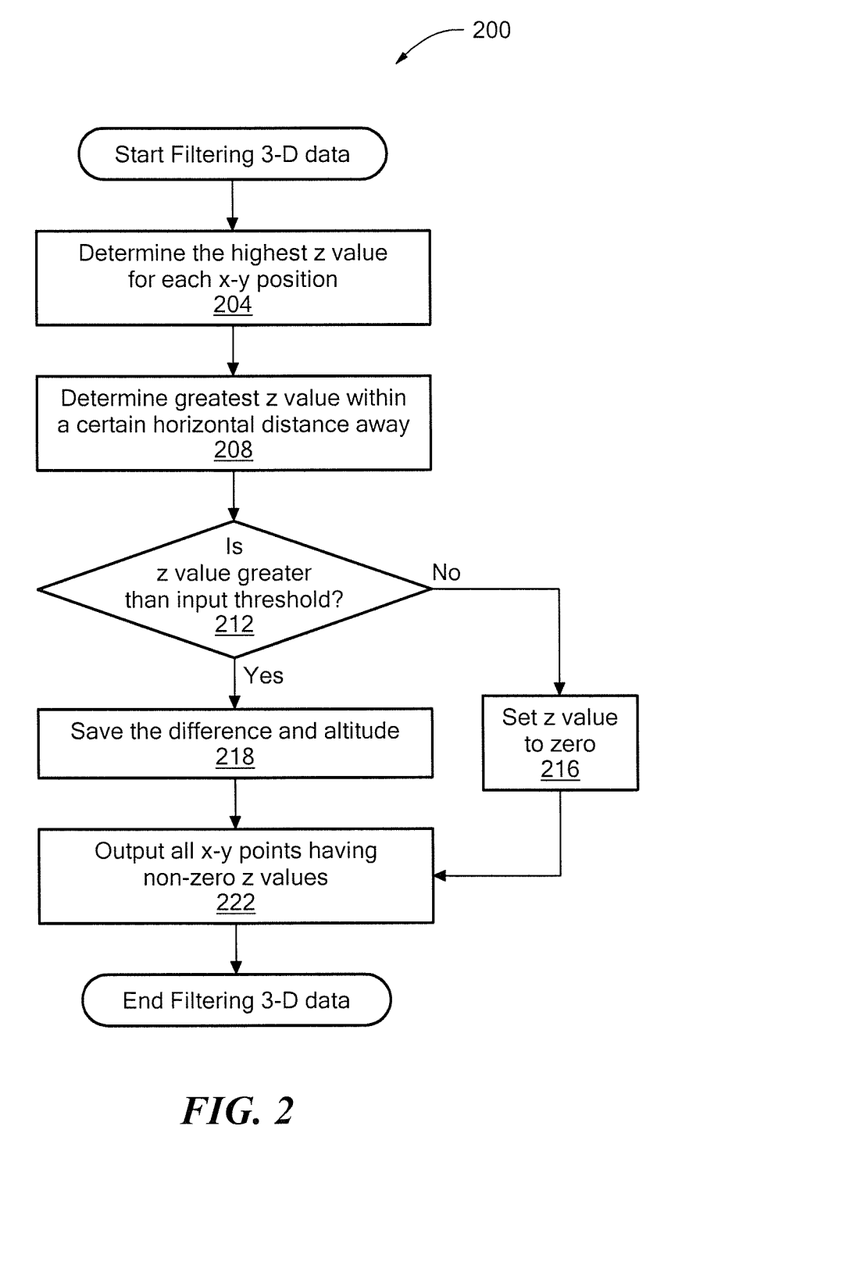
FIG. 2 is a flowchart of an example of a process to filter 3-D data.

Referring to FIG. 2, one example of a process to filter the 3-D data from a 3-D sensor in processing block 108 is a process 200. Process 200 determines the highest z value for each x-y position (204). For example, the x-y plane is the ground and the z-coordinate represents height or altitude from the ground. For each x-y position with the highest z value determined in processing block 204, process 200 determines the greatest z value (altitude) within a specified horizontal distance (e.g., 1 to 5 meters) from the x-y position (208). Process 200 determines if the greatest z value (altitude) determined in processing block 208 is greater than an input threshold (e.g., 10 meters for an urban environment, 5 meters for suburban or country environment) (212). For example, the input threshold is used to filter out low to the ground objects (e.g., fences) that are not buildings. If the z value is not greater than the input threshold, process 200 sets (e.g., amends) the z value (altitude) for that point to zero (216).

If the z value is greater than the input threshold, process 200 stores the difference of the z value (altitude) and the input threshold, and the z value (218). For example, both the altitude and the building height are stored for output to a KML file. Process 200 outputs all x-y points have a non-zero z value, which form a set of filtered points (222).

Figure 3A:
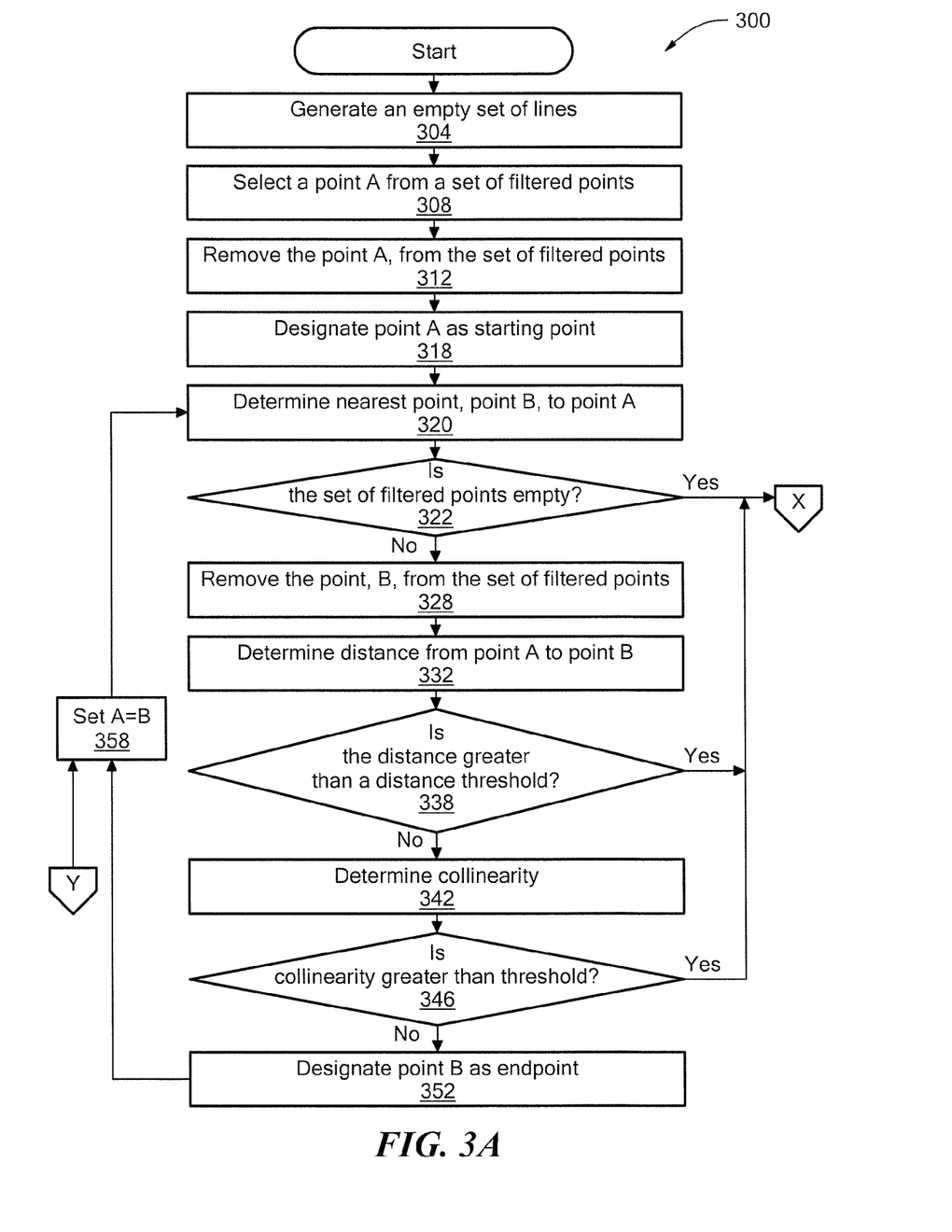
FIGS. 3A and 3B are a flowchart of an example of a process to determine building edges.
Figure 3B:
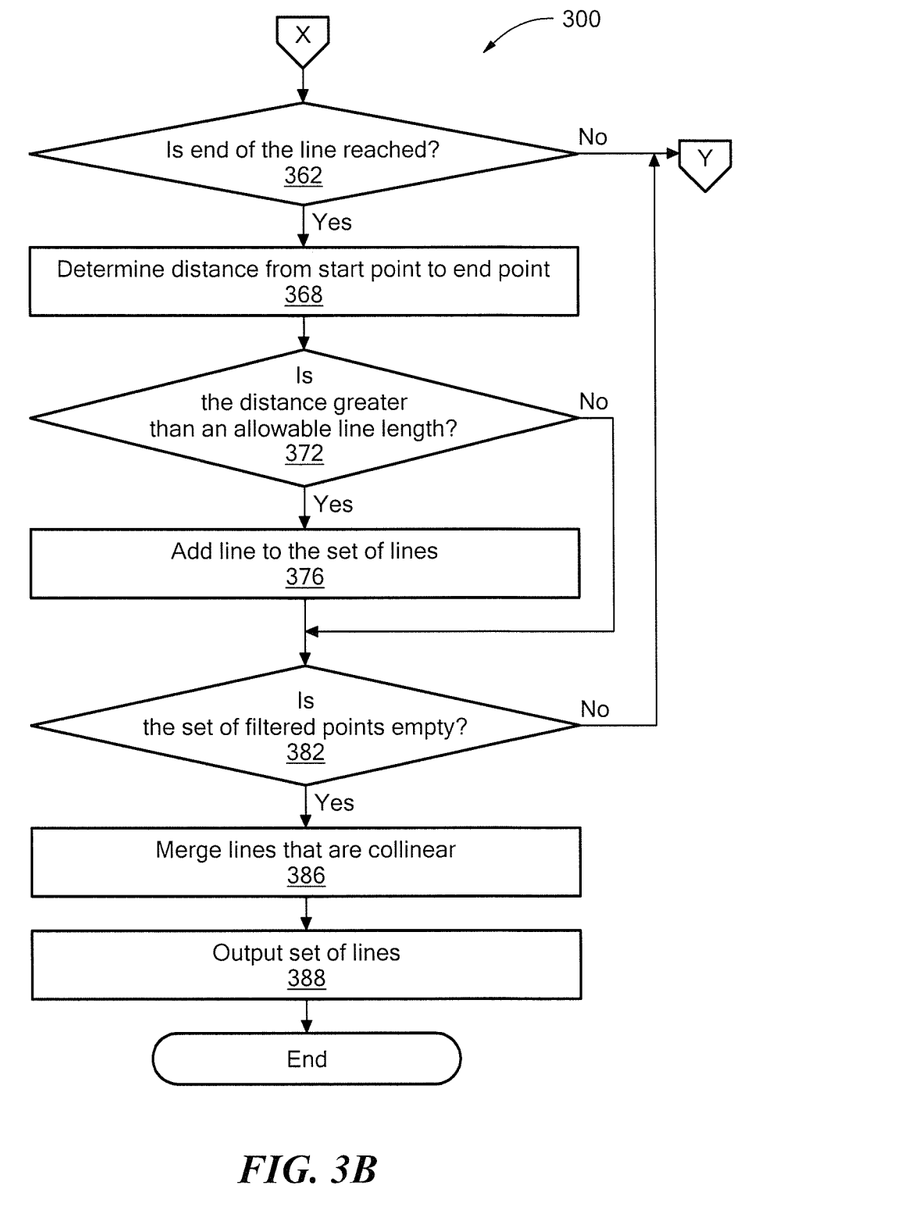

Referring to FIGS. 3A and 3B, an example of a process to detect building edges in processing block 114 is a process 300. Building edges are generally lines. Process 300 generates an empty set of lines (304). As process 300 is executed the empty set of lines becomes populated with lines if building edges are detected. Process 300 selects any point called point A from the set of filtered points (308). For example, the set of filtered points generated by process 200 is used in processing block 308. Process 300 removes a point, called point A, from the set of filtered points and designates point A as a starting point (312). For example, point A may be any point in the set of filtered points.

Process 300 determines the nearest point to point A, which is designated as point B. Process 300 determines if the set of filtered points is empty (322) and if the set of filtered points is not empty removing point B from the set of filtered points (328). Process 300 determines a distance from point A to the point B (332) and determines if the distance from point A to point B is greater than a distance threshold (338). For example, a distance beyond the distance threshold is considered too far away to be part of the same line. In one example, a distance threshold of 1.0 meter produces good results for a data set derived from a dense urban environment.

If the distance from point A to point B is less than or equal to the distance threshold, process 300 determines a collinearity of point A and point B (342). Process 300 determines if the collinearity determined in processing block 342 is greater than a collinearity threshold (346). For example, a point that is beyond the collinearity threshold is considered to be too far from the line to be part of the line. In one particular example, a collinearity threshold of 0.5 meter, for example, produces good results for a data set from a dense urban environment.

If the collinearity determined in processing block 342 is less than or equal to a collinearity threshold, process 300 designates point B as an end point, sets point A equal to point B (358) and repeats processing block 320. For example, in processing block 358 point B becomes or is re-designated as point A.

If the set of filtered points is empty, the distance determined in processing block 332 is greater than the distance threshold or the collinearity determined in processing block 342 is greater than the collinearity threshold, process 300 determines if the end of a line has been reached (362).

If the end of the line has been reached, process 300 determines a distance from the start point of the line to the end point of the line (368) and determines if the distance from the start point to the end point is greater than an allowable line length (372). If the distance from the start point to the end point is greater than the allowable line length process 300 adds the line to the set of lines (376). For example, lines that are smaller than the allowable line length are not considered building edges. For example, 2 meters would be used for houses, and 5 meters would be used for larger buildings.

Process 300 determines if the set of filtered points is empty (382) and if the set of filtered points is empty, merges lines that are collinear (386). For example, two lines that have endpoints that are close to each other (e.g., 1.0 meter) may be merged.

Figure 4:
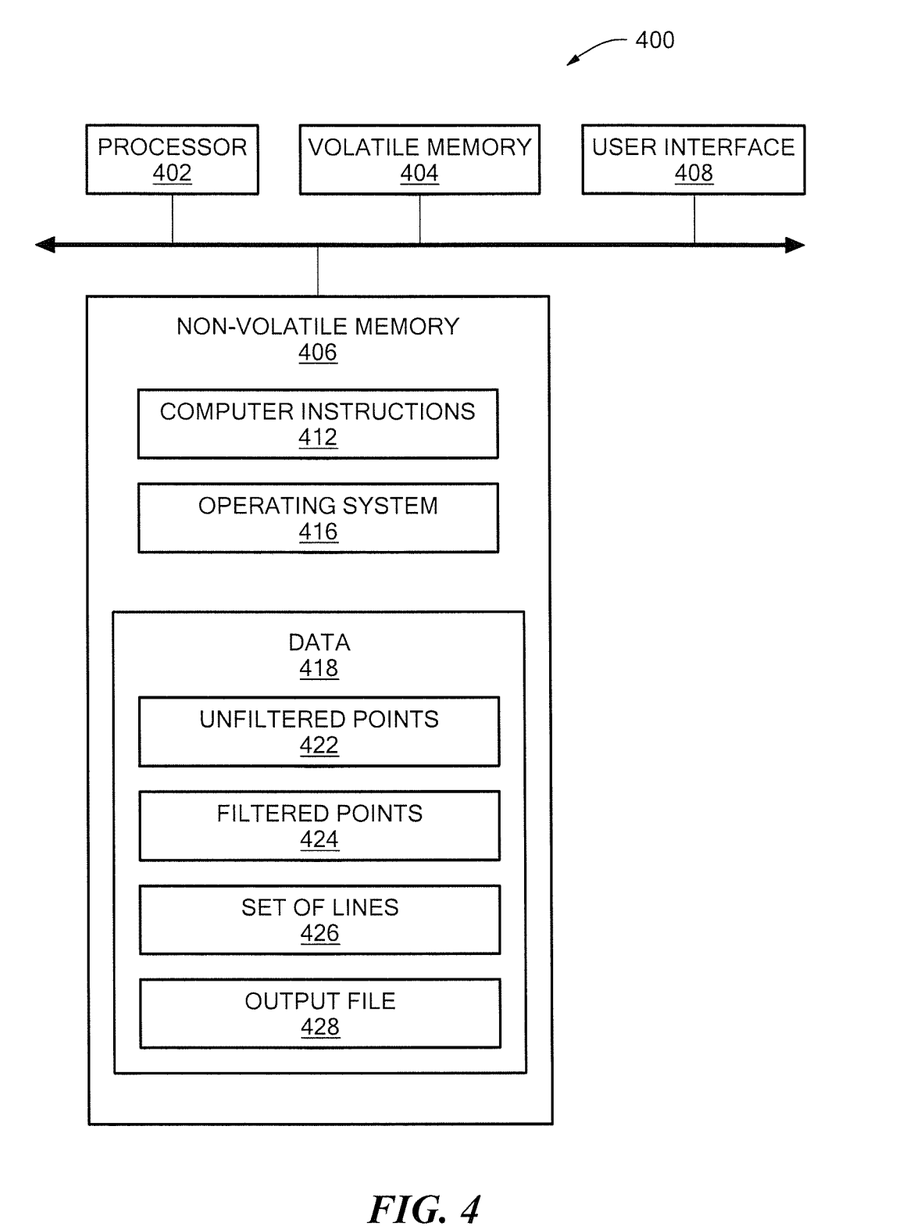
FIG. 4 is a computer on which any of the processes of FIGS. 1 to 3B may be implemented.

Referring to FIG. 4, a computer 400 may be used to execute all or part of the processes described herein (e.g., the processes 100, 200, 300). The computer 400 includes a processor 402, a volatile memory 404, a non-volatile memory 406 (e.g., hard disk), for example, and a user interface (UI) 408 (e.g., a mouse, a keyboard, a touch screen and so forth). In other examples of a computer 400, the UI 408 may not be included. Non-volatile memory 406 includes an operating system 416; data 418; and computer instructions 412 which are executed out of volatile memory 404 to perform all or part of processes 100, 200, 300. In one example, the data 418 may include unfiltered points 422 (e.g., received from a 3-D sensor), filtered points 424 (e.g., as an output of a process 200), a set of lines 426 (e.g., as an output of a process 300) and an output file 428 (e.g., as an output of a process 100).

The processes described herein (e.g., processes 100, 200, 300) are not limited to use with the hardware and software of FIG. 4; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any or part of the processes 100, 200, 300, for example, and to generate output information.

The processes described herein are not limited to the specific embodiments described herein. For example, the processes are not limited to the specific processing order of the process steps in FIGS. 1 to 3B. Rather, any of the processing steps of FIGS. 1 to 3B may be re-ordered, combined or removed, performed in parallel or in serial, as necessary, to achieve the results set forth above.

Process steps in FIGS. 1 to 3B associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference.

Other embodiments not specifically described herein are also within the scope of the following claims.

What is claimed is:

1. A computerized method to automatically detect buildings, comprising:
   receiving three-dimensional (3-D) data from a 3-D sensor;
   filtering the 3-D data to form a set of filtered points comprising points greater than an altitude threshold;
   determining if each point of the set of filtered points is on a line by processing the set of filtered points in one pass comprising:
   a) locating a first point of the set of filter points nearest to a second point of the set of filtered points;
   b) determining if the distance between the first point and the second point is greater than a distance threshold;
   c) determining if the first point and the second point have collinearity greater than a collinearity threshold;
   d) designating the first point as an endpoint of a line that includes the second point if the distance between the first point and the second point is greater than the distance threshold and if the first point and the second point have collinearity greater than the collinearity threshold;
   e) repeating steps a to e substituting an unprocessed point as the first point and the first point as the second point if the first point is designated as an endpoint; and
   generating an output file comprising a set of lines corresponding to building edges based on the processing of the set of filtered points in one pass.

2. The computerized method of claim 1 wherein determining if each point is on a line by processing the set of filtered points in one pass further comprises:
   determining if an end of a line is reached;
   determining a distance from a start point of the line to an end point of the line if the end of the line is reached;
   determining if the distance from the start point of the line and the end point of the line is greater than an allowable line length; and
   adding the line to a set of lines if the distance is greater than an allowable line length.

3. The computerized method of claim 1 wherein determining if each point is on a line by processing the set of filtered points in one pass further comprises merging lines that are collinear.

4. The computerized method of claim 1 wherein receiving three-dimensional (3-D) data from a 3-D sensor comprises receiving 3-D data from at least one of a laser detection and ranging (LADAR) sensor, a synthetic aperture radar (SAR) and a stereo-optic imager.

5. The computerized method of claim 1 wherein generating an output file comprising a set of lines based on the processing of the set of filtered points in one pass comprises generating an output file comprising keyhole markup language (KML) file.

6. The computerized method of claim 1 wherein filtering the 3-D data to form a set of filtered points comprising points greater than an altitude threshold comprises determining the greatest z value within a horizontal distance from an x-y position.

7. An apparatus comprising:
   circuitry to automatically detect buildings comprising circuitry to:
   receive three-dimensional (3-D) data from a 3-D sensor;
   filter the 3-D data to form a set of filtered points comprising points greater than an altitude threshold;
   determine if each point of the set of filtered points is on a line by processing the set of filtered points in one pass comprising circuitry to:
   a) locate a first point of the set of filter point nearest to a second point of the set of filtered points;
   b) determine if the distance between the first point and the second point is greater than a distance threshold;
   c) determine if the first point and the second point have collinearity greater than a collinearity threshold;
   d) designate the first point as an endpoint of a line that includes the second point if the distance between the first point and the second point is greater than the distance threshold and if the first point and the second point have collinearity greater than the collinearity threshold;
   e) repeat steps a to e substituting an unprocessed point as the first point and the first point as the second point if the first point is designated as an endpoint; and
   generate an output file comprising a set of lines corresponding to building edges based on the processing of the set of filtered points in one pass.

8. The apparatus of claim 7 wherein the circuitry comprises at least one of a processor, a memory, programmable logic and logic gates.

9. The apparatus of claim 7 wherein the circuitry to determine if each point is on a line by processing the set of filtered points in one pass further comprises circuitry to:
   determine if an end of a line is reached;
   determine a distance from a start point of the line to an end point of the line if the end of the line is reached;
   determine if the distance from the start point of the line and the end point of the line is greater than an allowable line length; and
   add the line to a set of lines if the distance is greater than an allowable line length.

10. The apparatus of claim 7 wherein the circuitry to determine if each point is on a line by processing the set of filtered points in one pass further comprises circuitry to merge lines that are collinear.

11. The apparatus of claim 7 wherein the circuitry to receive three-dimensional (3-D) data from a 3-D sensor comprises circuitry to receive 3-D data from at least one of a laser detection and ranging (LADAR) sensor, a synthetic aperture radar (SAR) and a stereo-optic imager.

12. The apparatus of claim 7 wherein the circuitry to generate an output file comprising a set of lines based on the processing of the set of filtered points in one pass comprises circuitry to generate an output file comprising keyhole markup language (KML) file.

13. The apparatus of claim 7 wherein the circuitry to filter the 3-D data to form a set of filtered points comprising points greater than an altitude threshold comprises circuitry to determine the greatest z value within a horizontal distance from an x-y position.

14. An article comprising:
   a non-transitory machine-readable medium that stores executable instructions to automatically detect buildings, the instructions cause a machine to:
   receive three-dimensional (3-D) data from a 3-D sensor;
   filter the 3-D data to form a set of filtered points comprising points greater than an altitude threshold;
   determine if each point of the set of filtered points is on a line by processing the set of filtered points in one pass comprising instructions causing the machine to:

a) locate a first point of the set of filter point nearest to a second point of the set of filtered points;
b) determine if the distance between the first point and the second point is greater than a distance threshold;
c) determine if the first point and the second point have collinearity greater than a collinearity threshold;
d) designate the first point as an endpoint of a line that includes the second point if the distance between the first point and the second point is greater than the distance threshold and if the first point and the second point have collinearity greater than the collinearity threshold;
e) repeat steps a to e substituting an unprocessed point as the first point and the first point as the second point if the first point is designated as an endpoint; and generate an output file comprising a set of lines corresponding to building edges based on the processing of the set of filtered points in one pass.

15. The article of claim 14 wherein the instructions causing the machine to determine if each point is on a line by processing the set of filtered points in one pass further comprises instructions causing the machine to:
determine if an end of a line is reached;
determine a distance from a start point of the line to an end point of the line if the end of the line is reached;
determine if the distance from the start point of the line and the end point of the line is greater than an allowable line length; and
add the line to a set of lines if the distance is greater than an allowable line length.

16. The article of claim 14 wherein the instructions causing the machine to determine if each point is on a line by processing the set of filtered points in one pass further comprises instructions causing the machine to merge lines that are collinear.

17. The article of claim 14 wherein the instructions causing the machine to receive three-dimensional (3-D) data from a 3-D sensor comprises instructions causing the machine to receive 3-D data from at least one of a laser detection and ranging (LADAR) sensor, a synthetic aperture radar (SAR) and a stereo-optic imager.

18. The article of claim 14 wherein the instructions causing the machine to generate an output file comprising a set of lines based on the processing of the set of filtered points in one pass comprises instructions causing the machine to generate an output file comprising keyhole markup language (KML) file.

19. The article of claim 14 wherein the instructions causing the machine to filter the 3-D data to form a set of filtered points comprising points greater than an altitude threshold comprises instructions causing the machine to determine the greatest z value within a horizontal distance from an x-y position.

* * * * *